United States Patent [19]

Rutschow et al.

[11] 4,030,953
[45] June 21, 1977

[54] METHOD OF MOLDING FIBERGLASS REFLECTING ANTENNA

[75] Inventors: Joseph Fredrick Rutschow, Sunnyvale; Bruno Zucconi, Alameda, both of Calif.

[73] Assignees: Scala Radio Corporation, San Leandro; Milliflect, Sunnyvale, both of Calif.

[22] Filed: Feb. 11, 1976

[21] Appl. No.: 657,045

[52] U.S. Cl. .............................. 156/79; 156/245; 156/276; 343/912
[51] Int. Cl.² ........................................ H01Q 15/16
[58] Field of Search ................ 343/840, 872, 912; 156/79, 245, 276

[56] References Cited

UNITED STATES PATENTS 2,948,896 8/1960 Hart .................................. 343/912
3,119,109 1/1964 Miller ................................ 343/912

*Primary Examiner*—Eli Lieberman
*Attorney, Agent, or Firm*—Flehr, Hohbach, Test, Albritton & Herbert

[57] ABSTRACT

Fiberglass antenna for reflecting electromagnetic radiation. The antenna includes metal reflecting surface embedded within the fiberglass. The antenna is fabricated in a heated, vacuum injected mold.

2 Claims, 5 Drawing Figures

U.S. Patent   June 21, 1977   4,030,953
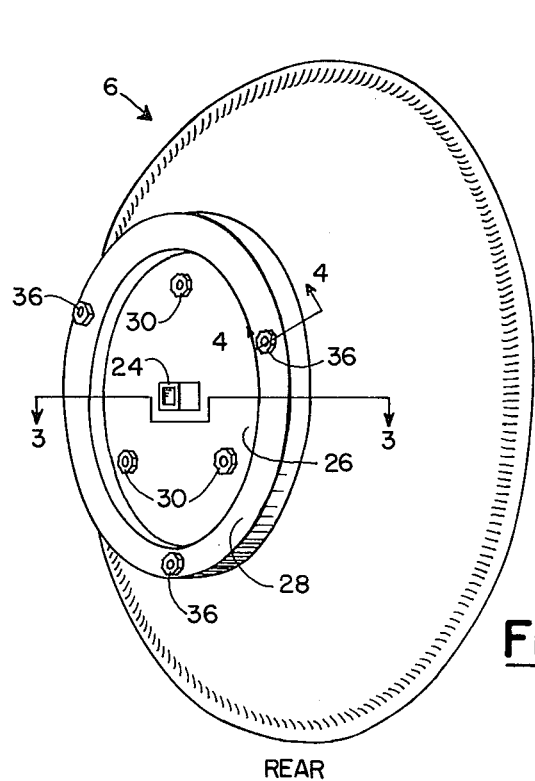
FIG.2 REAR
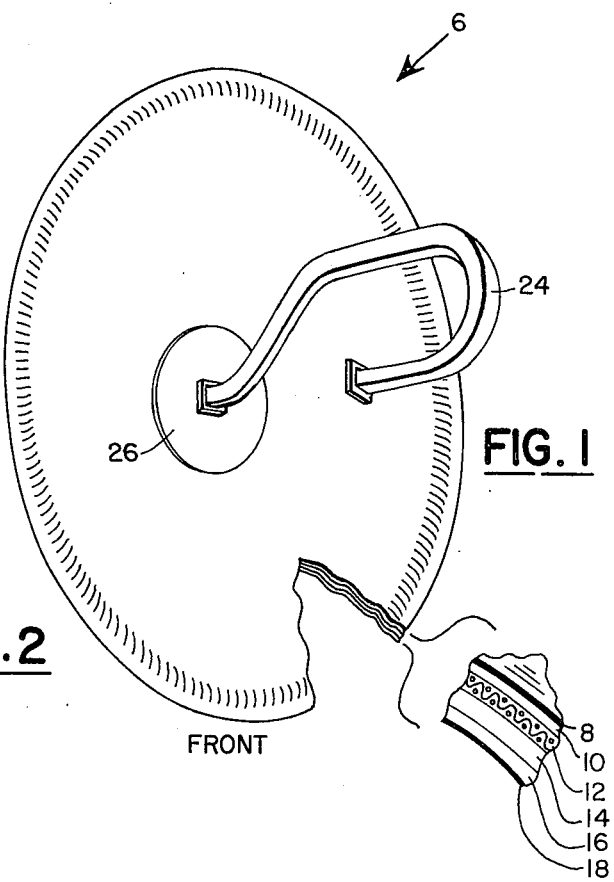
FIG.1 FRONT
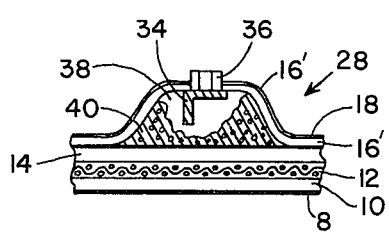
FIG.4
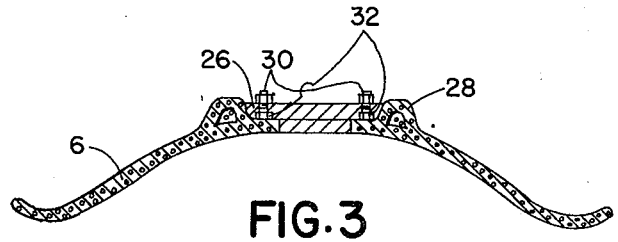
FIG.3
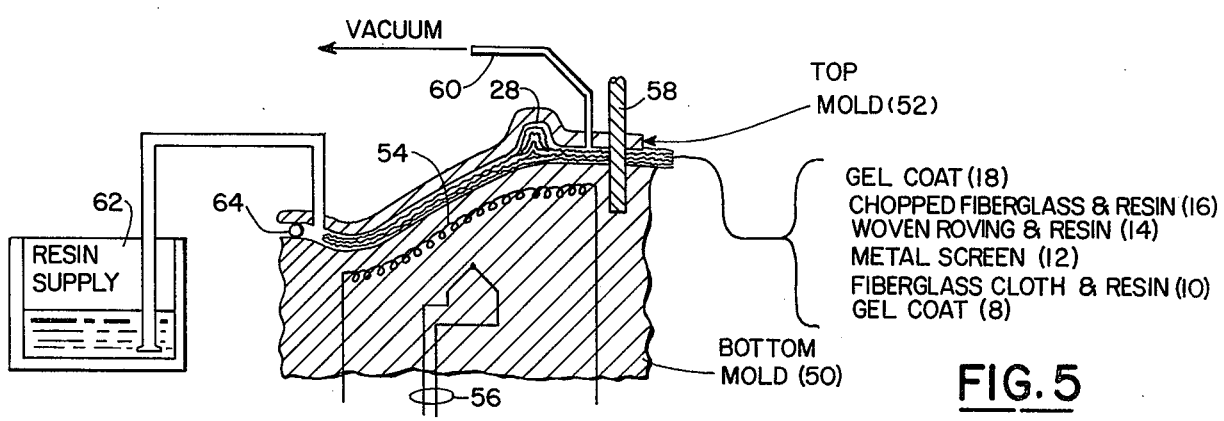
FIG.5

METHOD OF MOLDING FIBERGLASS REFLECTING ANTENNA

BACKGROUND OF THE INVENTION

1. Field of the Invention

This invention generally relates to reflecting antennas for electromagnetic radiation and, more particularly, to reflecting antennas fabricated from fiberglass materials.

2. Description of the Prior Art

The most common type of electromagnetic reflecting antenna in use today is the spun aluminum dish. The spun aluminum dish is constructed from a disk-shaped, aluminum sheet that is pressed into a hollow shape or mold. The dish is formed by pressing an aluminum sheet against a rotating form or spinning chuck.

Although aluminum dish antennas are widely used today, these antennas have the problem of being subject to distortion and warpage. The aluminum is cold worked during the spinning process and therefore will distort if not handled carefully. In addition, aluminum is a very soft material and is easily dented by impact. Also, spun aluminum dish antennas are not easily produced to the close tolerances required in high frequency microwave applications.

Reflecting antennas are also manufactured from fiberglass and can be catagorized according to the process of fabrication. One such process is the technique of spray-up where the antenna is formed by the simultaneous deposition of glass fibers and resin into a mold to which a metalized reflecting surface has been applied. Fiberglass roving is fed through a mechanical chopper that cuts the filaments into short strips. The strips are thereafter fed into a resin-catalyst stream and deposited in the mold.

Although fiberglass antennas are easily constructed by this technique, sprayed-up fiberglass material is not as strong as comparably sized aluminum antennas. Accordingly, to achieve a strength comparable to aluminum, the sprayed-up fiberglass antennas typically have a substantially increased thickness and a correspondingly increased weight. Further, sprayed-up fiberglass antennas have poor surface accuracy because the polyester resin used in the fabrication process shrinks between 6% and 8% during curing. The shrinkage causes the surface to become distorted. In addition, after the antenna is molded, a portion of this shrinkage is stored as strain energy. Thus, the antenna can be easily deformed by subsequent impact.

Another process for manufacturing fiberglass antennas is the procedure of hand layup or contact molding wherein the woven roving is placed into the mold by hand. The resin and catalyst are also applied by hand. The air trapped in the mold is removed with rollers. Typically the layers of glass and resin are added one at a time to build up the cross section of the antenna to design thickness. Although the antennas fabricated by this method are of high strength, one problem with the process is that it entails high labor costs.

In both the aforedescribed spray-up and hand layup techniques the fiberglass antenna must have a metallicized surface applied to the fiberglass that will reflect electromagnetic radiation. Typically, this metallicized surface is applied using an aluminum flame spray process. In this process aluminum wire is heated to vaporization and thereafter sprayed upon the fiberglass surface. The vaporized aluminum solidifies into a conducting surface. Although this type of surface is easily obtained, it is difficult to achieve a uniform thickness across the surface of the antenna and long term adherence of the aluminum to the fiberglass.

SUMMARY OF THE INVENTION

The present invention is directed to a fiberglass reflecting antenna and method. The antenna includes a metal reflecting surface embedded within the fiberglass. A typical cross section of the antenna dish includes the following layers of material: a gel coat exterior surface; fiberglass cloth impregnated with resin; a metal screen; woven roving impregnated with resin; chopped fiberglass and resin; and a second gel coat exterior surface. The antenna is fabricated in a heated mold.

It is an object of the present invention to provide a novel method and apparatus that overcomes the limitations and disadvantages of the prior art.

A further object of the present invention is to provide a uniform metallicized surface which is integral to a fiberglass reflecting antenna.

An additional object of the present invention is to achieve both substantially higher dimensional accuracy and reduced tolerances of surface variation in the production of fiberglass antennas.

Another object of the present invention is to fabricate a stabilized reflector for electromagnetic radiation that is not subject to deformation and warping after curing.

Still a further object of the present invention is to provide a reflecting antenna that is substantially lighter in weight and more easily installed than comparable prior art antennas.

Also it is an object of the present invention to fabricate a fiberglass antenna that achieves the strength and rigidity of a hand built up antenna while reducing the time and labor costs involved.

The process reduces the reflector resin content and produces a reflector that is considerably stronger, stiffer and more dimensionally stable than those produced by the sprayup process.

Additional objects and features of the invention will appear from the following description in which the preferred embodiment has been set forth in detail in conjunction with the accompanying drawings.

BRIEF DESCRIPTION OF THE DRAWINGS

FIG. 1 is an orthogonal view of the front of a fiberglass reflecting antenna according to the present invention wherein a portion of the antenna has been cut away and illustrated in expanded size;

FIG. 2 is an orthogonal view of the rear of the fiberglass reflecting antenna of FIG. 1;

FIG. 3 is a sectional view taken along line 3—3 of the fiberglass reflecting antenna of FIG. 2;

FIG. 4 is a sectional view taken along line 4—4 of the fiberglass reflecting antenna of FIG. 2; and FIG. 5 is a schematic diagram, partially in section, of the molds used in fabricating the fiberglass antenna of FIG. 1.

DESCRIPTION OF THE PREFERRED EMBODIMENT

FIGS. 1 and 2 illustrate a fiberglass electromagnetic reflecting antenna 6 according to the preferred embodiment. The reflecting antenna is generally concave or dish shaped with a flared peripheral edge. The concave, front surface (FIG. 1) of the reflecting antenna is formed by an outer layer 8 of gel coat. The gel coat surface is thirty mils thick and provides a weather resistant surface as well as a smooth, exterior finish for the antenna. In the preferred embodiment any commercially available gel coat which will properly adhere to the fiberglass antenna can be used.

The lamina 10 located behind the gel coat 8, FIG. 1 is one ply light weight fiberglass cloth mixed with resin. In like manner located behind the fiberglass cloth lamina 10 is a concave circular screen 12. The screen is fabricated from number sixteen mesh, metal screen. The screen provides a metallic surface for reflecting the electromagnetic radiation incident on the antenna and is the electrical surface of the antenna. In the preferred embodiment aluminum insect screen is employed. The purpose of the fiberglass cloth layer 10 is to separate the metal screen 12 from the gel coat 8 and thereby prevent the metal screen from penetrating the surface of the gel coat.

Located behind the metal screen 12, FIG. 1 is a lamina of woven fiberglass roving. During fabrication the woven roving is inserted dry into the mold and impregnated with resin by vacuum injection. Behind the layer 14 of woven roving is a lamina of chopped fiberglass and polyester resin. In the preferred embodiment this chopped fiberglass layer has a thickness of one sixteeth to one eighth of an inch. The rear exterior surface of the antenna 6, FIG. 2 is covered with a second layer 18 of gel coat. This second layer is identical in composition to the gel layer 8 on the front surface of the antenna hereinbefore described.

The reflecting antenna 6, FIG. 1 also includes a microwave feed horn 24 of conventional construction. The end of the feed horn is located at the focal point of the electromagnetic reflecting surface of the antenna which is formed by the metal screen 12. The feed horn 24, FIG. 2, is rigidly connected to a circular mounting plate 26 of conventional construction. The mounting plate 26 has a substantial peripheral shoulder therein that permits the front surface of the mounting plate 26 to serve as part of the reflecting surface of the antenna. It should be appreciated that the feed horn and the mounting plate are commercially available components and are not in themselves part of the present invention. The mounting plate is positioned within a circular shoulder 28 formed in the rear of the reflecting antenna (FIG. 2) and is rigidly attached therein by a plurality of bolts 30 which threadably engage an annular mounting ring 32, FIG. 3. The annular mounting ring is permanently bonded to the back of the antenna 6, FIG. 3 on the surface inside of the shoulder 28. During fabrication of the antenna the mounting ring 32 is precisely aligned with respect to the axis of symmetry of the antenna. The precise positioning of the mounting ring in turn aligns the feed horn 24 with respect to the focal point of the antenna.

FIG. 4 illustrates a sectional view taken through the raised circular shoulder 28. In cross section the shoulder has a front layer of gel coat 8 that is backed in turn with a layer 10 of fiberglass cloth and resin, a layer 12 of metal screen, a layer 14 of woven roving and resin, and a layer of chopped fiberglass and resin 16'. These laminae are distributed in the manner hereinbefore described. Within the shoulder 28 is rigidly retained a bracket 34 to which is welded a threaded insert 36. In the preferred embodiment the bracket is fabricated from a metal bar or casting. The mounting insert, which protrudes from the rear of the antenna 6, is attached to the imbedded metal bar and forms one of the attachment points for the antenna mounting assembly (not shown). The rear exterior surface of the shoulder is covered by a layer of gel coat 18 and is backed by a layer of chopped fiberglass and resin 16'. The bracket 34 is rigidly attached to the antenna by a second layer of chopped fiberglass 38 which substantially fills the raised portion of the shoulder 28. The space between the two chopped fiberglass layers 16', 38 and the woven roving layer 14 is filled with pour foam 40, as hereinafter described. The foam acts as a filler and eliminates the occurrence of voids in the reflective surface.

In FIG. 5 the apparatus used for fabricating the reflecting antenna 6 is illustrated. The apparatus includes a bottom mold 50 and a top mold 52. The bottom mold shapes the concave front surface of the antenna and the top mold 52 forms the rear surface of the antenna with its raised circular shoulder 28. The bottom mold is electrically heated by a plurality of conduction heaters 54. To accelerate the production cycle, tubing (not shown) can be attached to the bottom mold for circulating hot and cold fluids therein. The temperature of the mold is monitored and controlled by a plurality of thermocouples 56. At the precise center of the bottom mold is located a vertical tooling post 58. The tooling post provides symmetrical alignment for both the removable top mold 52 and also the annular mounting ring 32, FIG. 3. The common periphery of the molds is sealed by an O-ring 64 so that during fabrication resin is drawn using a vacuum line 60 from a resin supply 62 into the space between the top and bottom molds.

Process of Antenna Fabrication

The reflecting antenna 6, FIG. 1 is fabricated by first cutting the fiberglass woven roving into sections sized for insertion into the molds. These materials form respectively the layers 10, 14, FIG. 1. Next, the metal screen 12 is cut to fit the bottom mold 50. The screen is first cut in a circular shape and then is radially slit at four places. The slits extend from the peripheral edge of the screen and have a length of approximately two-thirds of the radius of the screen. When the screen is placed over the bottom mold 50, FIG. 5 the four sectors in the screen formed by the slits overlap and thereby form the concave, dish shape of the reflecting antenna.

After the above preliminary steps have been taken, the top mold 52, FIG. 5 is removed from the bottom mold and a release agent is applied to the bottom mold 50. The release agent used in the preferred embodiment is commercially available silicone oil which is sprayed onto the mold. Thereafter, a layer thirty mils thick of commercially available gel coat is sprayed into the bottom mold 50. The gel coat gives a smooth, weather proof, exterior finsih to the antenna surface. This gel coat layer is identified in FIG. 1 by reference numeral 8.

Next, the previously cut fiberglass cloth is impregnated with resin and placed into the bottom mold 50. The resin is used to adhere the cloth to both the gel coat 8 previously applied to the bottom mold and the metal screen. The purpose of the fiberglass cloth layer 10 is to prevent the metal screen 12 from penetrating the surface of the gel coat.

After the glass cloth 10 is in place on the bottom mold 50, the metal screen 12 is pressed down onto the boat cloth so that a good bond is formed. As hereinbefore described, the radial slits in the metal screen permit the screen to assume a concave shape which conforms to the surface of the bottom mold 50.

After the metal screen 12, FIG. 5 is in position in the bottom mold 50, the previously cut woven roving 14 is placed in the bottom mold. The woven roving is placed in the mold in a dry state and with a thickness of approximately four plys.

Simultaneously with the aforedescribed steps, the top mold 52, FIG. 5 is prepared. The top mold, which has been removed from the bottom mold 50, is first sprayed with a conventional release agent. In the preferred embodiment this release agent is commercially available silicon oil. Thereafter, the top mold is sprayed with a layer of commercially available gel coat. The gel coat is applied to achieve a layer 18, thirty mils thick that provides a smooth weather proof, exterior finish for the rear surface of the antenna.

Thereafter, a mixture of chopped fiberglass and polyester resin is applied on top of the gel coat 18 in the top mold 52. The chopped fiberglass and resin layer 16 is applied across the entire surface of the top mold. Referring to FIG. 4, this chopped fiberglass and resin layer is also placed across the raised shoulder 28 as indicated by reference numeral 16'. In the preferred embodiment the layer of chopped fiberglass and resin is composed of a mixture of 35% chopped roving and 65% polyester resin.

After the chopped fiberglass layer 16 has been applied, the brackets 34, FIG. 4 with the attached threaded inserts 36 are inserted into the top mold 52. In the preferred embodiment, the brackets are fabricated from metal bars or castings and the inserts 36 protrude beyond the surface of the antenna and are received in complimentary depressions (not shown) in the top mold 52. The brackets 34 are next secured in place in the circular shoulder 28 by spraying a covering layer of chopped fiberglass and polyester resin 38 into the circular depression forming the shoulder cavity.

Next, the shoulder cavity in the top mold 52 is filled with a layer of pour foam 40, FIG. 4. The foam is injected under pressure in the conventional manner and is retained in place by a splash plate (not shown). The splash plate is annular in shape and abuts against the surface of the top mold while covering over the shoulder cavity. The foam acts as a filler to eliminate air voids in the antenna and also pushes the metal screen 12 down onto the bottom mold 50 during the vacuum injection process. After the foam has hardened in place, the splash plate (not shown) is removed from the mold.

When the bottom and top molds 50, 52 have been prepared in the manner described above, the two molds are placed together and aligned using the tooling post 58, FIG. 5. The peripheral gap between the two molds is sealed with the O-ring 64. Then, the vacuum lines 60 located near the vertex of the top mold are connected to a vacuum pump (not shown). In the preferred embodiment there are four such vacuum lines. Thereafter, the resin supply 62 is sequentially connected to the molds by a plurality of resin conduits as illustrated in FIG. 5. In the preferred embodiment, resin is supplied at points around the periphery of the molds. The resin is vacuum injected into the molds through the conduits until resin runs out the associated vacuum lines 60.

When the space between the top mold 52, FIG. 5 and the bottom mold 50 is filled with resin, the mold heaters 54 are energized to commence heating the molds and curing the antenna. The resin supply 62 is then removed from the molds and the resin conduits are blocked so that the vacuum in the molds can be maintained. The purpose of maintaining the vacuum during this step is to insure that the metal screen is continuously pressed against the face of the bottom mold 50 while the antenna is curing. This insures that the metal screen accurately assumes the predetermined shape for optimum reflectance. Because the metal screen actually is the electrical surface of the antenna, obtaining a precise reproduction of the predetermined curvature is of critical importance.

The molds 50, 52 are heated quickly to a temperature of approximately 250° F± 20° which is substantially above the heat distortion temperature of the fiberglass. This temperature is measured by the thermocouples 56 located in the bottom mold. When the bottom mold reaches this predetermined temperature, the mold heaters 54 are turned off. The molds are then permitted to cool naturally.

The tubing (not shown) in the mold can be used to circulate hot and cold fluids therein and thus accelerate the heating and cooling cycle of the mold.

It should be appreciated that the antenna described herein is dimensionally stabilized by forming the antenna in the manner hereinbefore described and heating it to a point above its heat distortion temperature. This causes the stresses and strain energy locked into the antenna by resin shrinkage to be released. Thus, the antenna of the present invention is not subject to post cure deformation and warpage and has a substantially higher dimensional accuracy.

When the top and bottom molds 50, 52 have cooled to less than 180° F., the vacuum is removed and the top mold is separated from the bottom mold. Next, the annular mounting ring 32 is bonded in place to the rear surface of antenna with conventional adhesive. The annular mounting ring is aligned with a jig (not shown) to a position coaxial with the tooling post 58.

The antenna 6 is then removed from the bottom mold 50, FIG. 5 and the flash is cut off. The feed horn 24 is fastened on the antenna 6 by bolting the mounting plate 26, FIG. 3 to the annular mounting ring 32 using the bolts 30. The annular mounting ring 32 aligns the feed horn 24 with the focal axis of the antenna. The annular mounting ring in turn is aligned during fabrication with respect to the tooling post 58 in the manner hereinbefore described.

Although the best mode contemplated for carrying out the present invention has been hereinbefore shown and described, it will be apparent that modification and variation may be made without departing from what is regarded to be the subject matter of the invention.

What is claimed is:

1. Method of fabricating a fiberglass reflecting antenna, comprising the steps of:
   a. spraying a gel coat layer into a first convex antenna mold, said first mold having a predetermined curvature;
   b. applying a layer of resin impregnated fiberglass cloth on top of the gel coat in the first convex mold;
   c. placing an electromagnetic reflecting surface on top of the layer of resin impregnated cloth;
   d. placing a plurality of layers of dry fiberglass woven roving into the first convex mold on top of the reflecting surface;

spraying a gel coat layer into a second concave antenna mold, said second concave mold having both a shape and a predetermined curvature complimentary to said first convex mold;

f. applying a layer of chopped fiberglass and resin on top of the gel coat layer in the second mold;

g. anchoring a plurality of mounting brackets to said chopped fiberglass and resin layer in the second mold;

h. placing said first convex mold and said second concave mold together;

i. injecting resin into the space between said molds;

j. pressing said molds together while the injected resin hardens so that the electromagnetic reflecting surface assumes the predetermined curvature of said molds;

k. heating said molds to an elevated temperature that substantially relieves shrinkage induced stress in the fiberglass; and l. removing the antenna from the molds after cooling.

2. The method of claim 1 wherein the step of anchoring the mounting brackets further includes the steps of:

a. inserting a plurality of mounting brackets into the layer of chopped fiberglass and resin in an area of the second concave mold having a circular, shoulder forming depression, said mounting brackets having mounting means positioned to protrude from the concave surface of the antenna;

b. anchoring the plurality of mounting brackets to the layer of chopped fiberglass and resin by applying a second layer of chopped fiberglass and resin into the circular, shoulder forming depression; and c. filling the circular shoulder forming depression in the second antenna mold with foam so that voids are eliminated from the antenna.

* * * * *